(12) United States Patent
Cheng et al.

(10) Patent No.: US 8,410,710 B2
(45) Date of Patent: Apr. 2, 2013

(54) LIGHT EMITTING DEVICE DRIVING CIRCUIT

(75) Inventors: Ching-Chi Cheng, Taipei (TW); Chung-Hung Yu, Taipei (TW)

(73) Assignee: Advanced-Connectek Inc., Taipei (TW)

( * ) Notice: Subject to any disclaimer, the term of this patent is extended or adjusted under 35 U.S.C. 154(b) by 203 days.

(21) Appl. No.: 12/893,397

(22) Filed: Sep. 29, 2010

(65) Prior Publication Data

US 2012/0019163 A1   Jan. 26, 2012

(30) Foreign Application Priority Data

Jul. 23, 2010  (TW) .............................. 99124397 A

(51) Int. Cl.
*H05B 41/24* (2006.01)
*H05B 39/02* (2006.01)

(52) U.S. Cl. .................... 315/224; 315/209 R
(58) Field of Classification Search ............ 315/307, 315/91, 291, 160, 200 R, 209 R, 185 R, 246
See application file for complete search history.

(56) References Cited

U.S. PATENT DOCUMENTS

| | | | | |
|---|---|---|---|---|
| 4,503,390 A | * | 3/1985 | Wells, Jr. ................... | 324/133 |
| 6,020,735 A | * | 2/2000 | Barnett et al. ............. | 324/133 |
| 8,058,820 B2 | * | 11/2011 | Yang ........................... | 315/307 |
| 2006/0039138 A1 | * | 2/2006 | Oxborrow ................... | 362/189 |
| 2011/0049993 A1 | * | 3/2011 | Yang ........................... | 307/66 |

* cited by examiner

*Primary Examiner* — Douglas W Owens
*Assistant Examiner* — Minh D A
(74) *Attorney, Agent, or Firm* — C. G. Mersereau; Nikolai & Mersereau, P.A.

(57) ABSTRACT

The invention provides a light emitting device driving circuit, comprising a rectification unit, a current limiting unit and a load. The load comprises a first light emitting device, a reverse voltage providing unit and a second light emitting device connected in serial. When the rectification unit rectifies an alternate current voltage to output a direct current voltage, and the current limiting unit limits the direct current in a predetermined value, the direct current is provided to the first light emitting device or the second light emitting device for operation. The reverse voltage providing unit provides a reverse voltage to reduce the total operating voltage of the light emitting devices in order to enhance the driving efficiency and the power factor.

6 Claims, 4 Drawing Sheets

LIGHT EMITTING DEVICE DRIVING CIRCUIT

FIELD OF THE INVENTION

The present invention relates to a light emitting device driving circuit, and particularly to a light emitting device driving circuit comprising a reverse voltage providing unit, where the total operating voltage of the light emitting device can be reduced in correspondence to the reverse voltage provided by the reverse voltage providing unit, thus enhancing the efficiency and the power factor of the light emitting device.

BACKGROUND

Traditionally, a driving circuit for light emitting diodes (LEDs) raises the operating voltage of the LEDs to enhance the efficiency. However, the voltage of alternate current power is in the form of a sine wave, and raising the operating voltage of the LEDs would lead to reduction of the power factor of the driving circuit. Once the power factor is reduced, power waste exists, which is in contradiction to the well-recognized concept to save energy.

Furthermore, the power factor can be increased by lowering the operating voltage of the LEDs. By doing this, however, the voltage drop between the power source and the LEDs would increase, thus reducing the overall efficiency of the circuits.

Thus, based on the problems of the conventional LED driving methods, the inventor focuses on a new invention of a light emitting device driving circuit.

SUMMARY OF THE INVENTION

An objective of the present invention is to provide a light emitting device driving circuit in order to achieve a stabilized light emitting device driving circuit with high efficiency and high power factor.

To achieve the foregoing objectives, the invention provides a light emitting device driving circuit, which comprises a rectification unit, a current limiting unit and a load. The load comprises a first light emitting device, a reverse voltage providing unit and a second light emitting device connected in serial. The rectification unit is configured to rectify an alternate current voltage from an outside power source to output a direct current voltage. The current limiting unit is electrically connected to the rectification unit and generates a direct current corresponding to the direct current voltage. The load is connected between the current limiting unit and the rectification unit. When the direct current passes through the first light emitting device or the second light emitting device, a voltage drop is generated between the two ends of the first light emitting device or the second light emitting device, and the reverse voltage providing unit provides a reverse voltage, the reverse voltage having an opposite polarity to the voltage drop. Thus, the total operating voltage of the light emitting devices is reduced, thus enhancing the efficiency and the power factor of the light emitting devices.

DETAILED DESCRIPTION OF THE INVENTION

The techniques employed by the present invention to achieve the foregoing objectives and the effects thereof are described hereinafter by way of examples with reference to the accompanying drawings.

Figure 1:
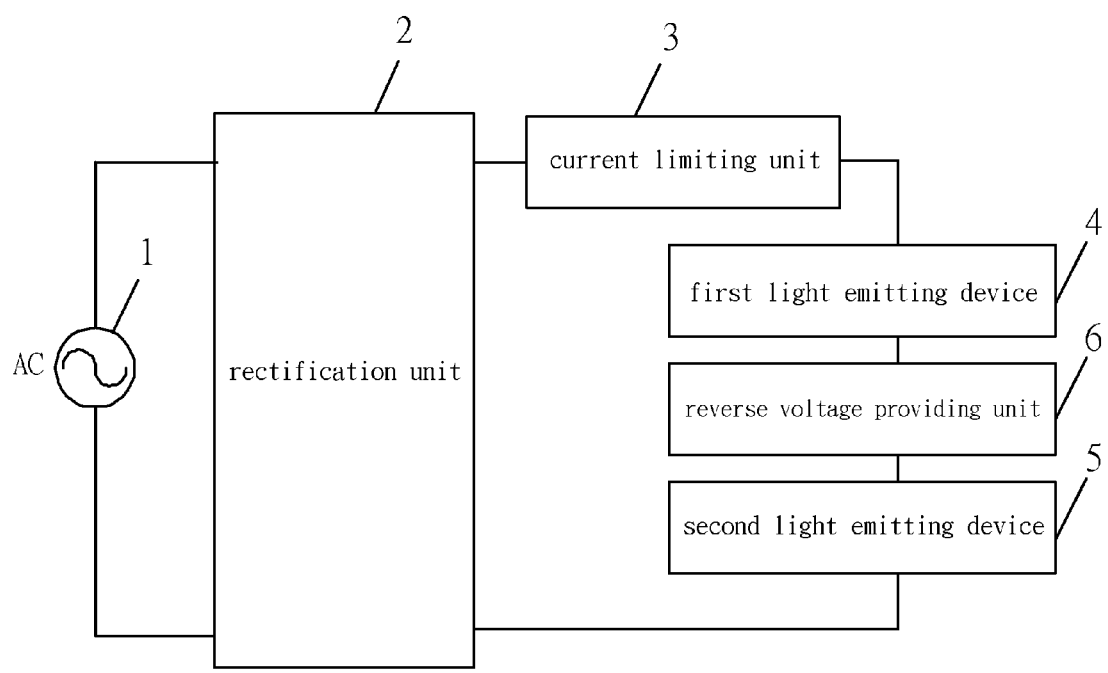
FIG. 1 is a schematic view of a light emitting device driving circuit according to an embodiment of the invention.

Referring to FIG. 1, which is a schematic view of a light emitting device driving circuit according to an embodiment of the invention. The invention is a light emitting device driving circuit, which comprises a rectification unit 2, a current limiting unit 3 and a load. The load has a first light emitting device 4, a reverse voltage providing unit 6 and a second light emitting device 5 connected in serial. Details of the electrical connections of the elements are shown in FIG. 1 and are hereby omitted.

The rectification unit 2 is configured to rectify an alternate current voltage from an outside power source 1 to output a direct current voltage. The current limiting unit 3 is electrically connected to the rectification unit 2 and generates a direct current corresponding to the direct current voltage for driving the first light emitting device 4 and the second light emitting device 5. The first light emitting device 4 and the second light emitting device 5 are preferably organic light emitting diodes (OLEDs), light emitting diodes (LEDs) or electroluminescent light emitting devices, and in this embodiment LEDs are used as examples.

When the direct current passes through the first light emitting device 4 or the second light emitting device 5, a voltage drop is generated between the two ends of the first light emitting device 4 or the second light emitting device 5, and the reverse voltage providing unit 6 provides a reverse voltage, in which the reverse voltage has an opposite polarity to the voltage drop. The reverse voltage providing unit is preferably a primary battery.

The direct current power, rectified by the rectification unit 2 and limited the current by the current limiting unit 3, is provided to the first light emitting device 4 and the second light emitting device 5 for emitting light. The reverse voltage providing unit 6 provides a reverse voltage, and the LED efficiency=output power/input power=(output voltage*output current)/(input voltage*input current). In this case, the output current equals the input current, and the output voltage is the total voltage drop of the first light emitting device 4, the reverse voltage providing unit 6 and the second light emitting device 5. Thus, the reverse voltage provided by the reverse voltage providing unit 6 may increase the LED efficiency and the power factor.

Figure 2:
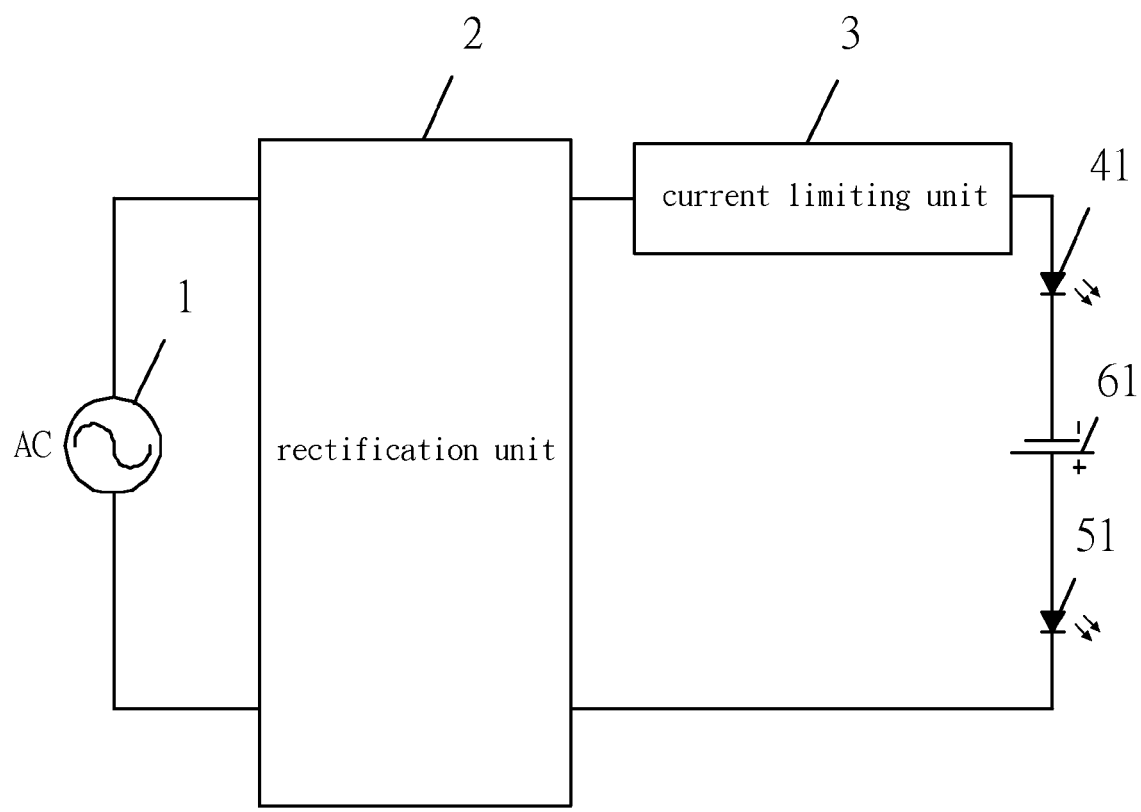
FIG. 2 is a schematic view of a light emitting device driving circuit according to another embodiment of the invention.

Referring to FIG. 2, which is a schematic view of a light emitting device driving circuit according to another embodiment of the invention. The embodiment comprises a rectification unit 2, a current limiting unit 3, a first light emitting device 41, a primary battery 61 and a second light emitting device 51. The rectification unit 2 and the current limiting unit 3 are electrically connected, and the other end of the current limiting unit 3 and the first light emitting device 41 are electrically connected. The two ends of the primary battery 61 are connected to the first light emitting device 41 and the second light emitting device 51. The second light emitting device 51 is electrically connected to the rectification unit 2. The alternate current source 1 provides direct current power, which is rectified by the rectification unit 2 and limited the current by the current limiting unit 3, and then provided to the first light emitting device 41 and the second light emitting device 51 for emitting light. The primary battery 61 provides a reverse voltage to reduce the total voltage difference of the load, and increase the LED efficiency and the power factor.

Figure 3:
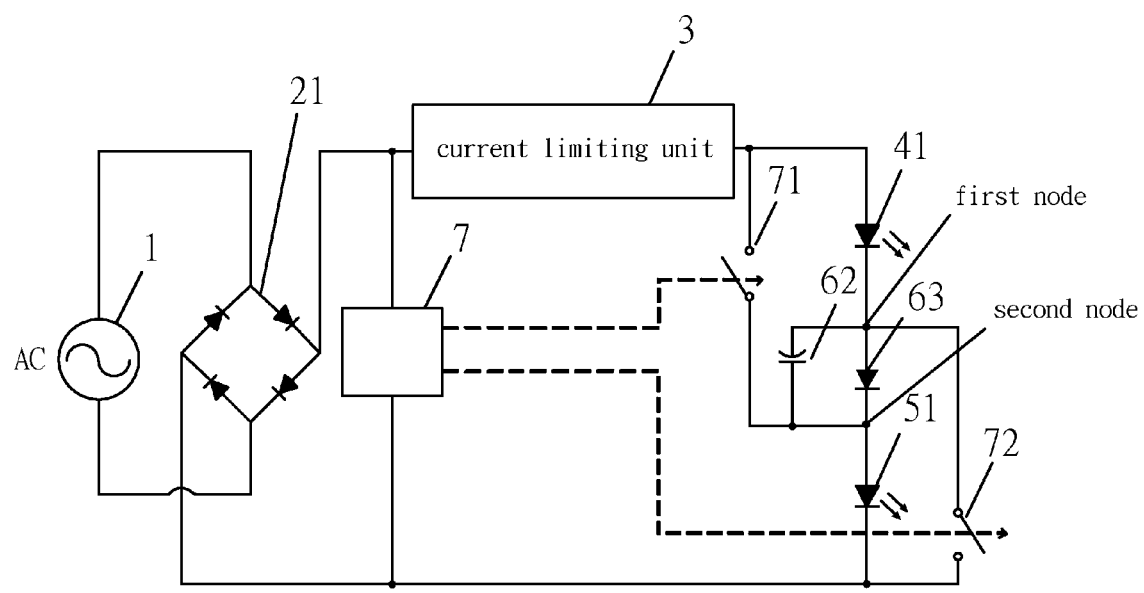
FIG. 3 is a schematic view of a light emitting device driving circuit according to a further embodiment of the invention.

Referring to FIG. 3, which is a schematic view of a light emitting device driving circuit according to a further embodiment of the invention. The embodiment comprises a rectification unit 2, a current limiting unit 3, a first light emitting device 41, a second light emitting device 51, a capacitance 62, a diode 63, a control unit 7, a first switch 71 and a second switch 72. The rectification unit 2 in this embodiment is a bridge rectifier 21, and the control unit 7 is provided for detecting the voltage of the bridge rectifier 21 and controlling the first switch 71 and the second switch 72.

The bridge rectifier 21 and the current limiting unit 3 are electrically connected, and the other end of the current limiting unit 3 is electrically connected to the first light emitting device 41 and the first switch 71. The first light emitting device 41 is electrically connected to the capacitor 62, the diode 63 and the second switch 72 at a first node. One end of the second light emitting device 51 is electrically connected to the capacitor 62, the diode 63 and the first switch 71 at a second node. The other end of the second light emitting device 51 is electrically connected to the bridge rectifier 21. The control unit 7 is electrically connected to the bridge rectifier 21 and, respectively, to the first switch 71 and the second switch 72, for detecting the direct current voltage output by the bridge rectifier 21 and controlling the first switch 71 and the second switch 72 corresponding to the direct current voltage.

The alternate current voltage is provided as a sine wave. When the alternate current voltage is provided to the bridge rectifier 21, the control unit 7 detects the voltage V generated by the bridge rectifier 21. When the voltage V is lower than a predetermined voltage value Vs (V<Vs), the control unit 7 generates a signal to switch off the first switch 71 and the second switch 72 to create conductance, thus the current flows to the capacitor 62 for electric power storage. When the voltage V is higher than the predetermined voltage value Vs (V>Vs), the control unit 7 generates a signal to switch on the first switch 71 and the second switch 72 to create an open circuit, thus the current flows to the first light emitting device 41 and the second light emitting device 51. In this case, the capacitor 62 with electric power stored therein generates a reverse voltage to reduce the total voltage difference of the load, and increase the LED efficiency and the power factor.

The first switch 71 and the second switch 72 can be metal-oxide-semiconductor field-effect transistors (MOSFETs), relays or bipolar junction transistors (BJTs), and in this embodiment the MOSFETs are used as the examples. The control unit 7 changes the gate voltage of the MOSFETs in correspondence to the detected direct current voltage, thus controlling the conductance or the open circuit of the MOSFETs.

Figure 4:
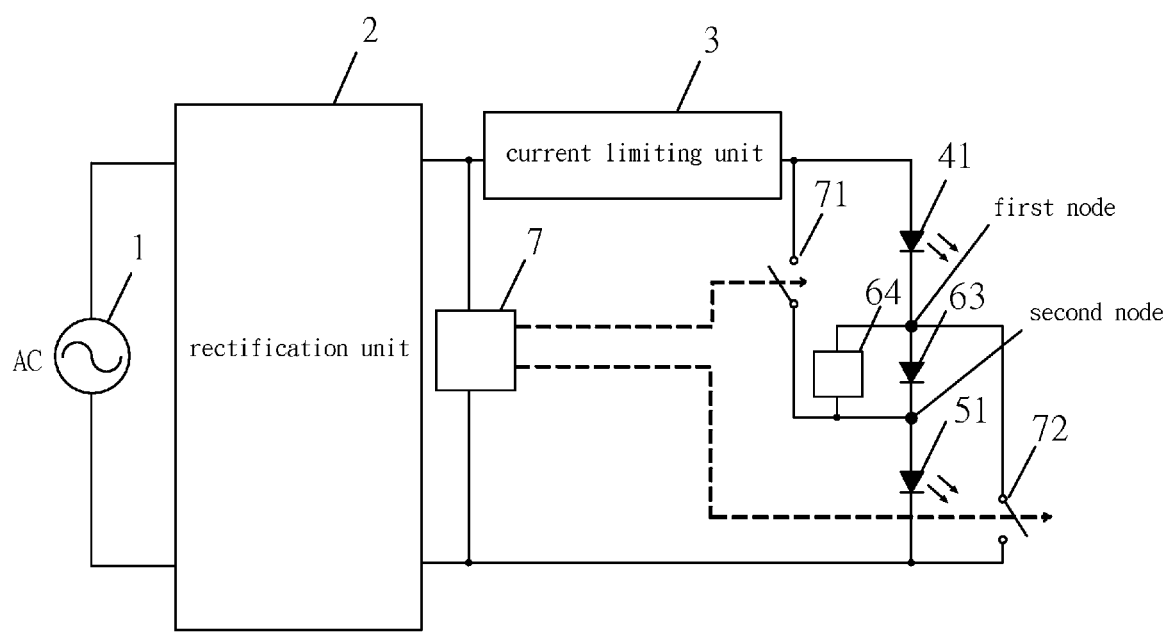
FIG. 4 is a schematic view of a light emitting device driving circuit according to a further embodiment of the invention.

Referring to FIG. 4, which is a schematic view of a light emitting device driving circuit according to a further embodiment of the invention. The embodiment comprises a rectification unit 2, a current limiting unit 3, a first light emitting device 41, a second light emitting device 51, a secondary battery 64, a diode 63, a control unit 7, a first switch 71 and a second switch 72. The control unit 7 is provided for detecting the voltage of the rectification unit 2 and controlling the first switch 71 and the second switch 72.

The rectification unit 2 and the current limiting unit 3 are electrically connected, and the other end of the current limiting unit 3 is electrically connected to the first light emitting device 41 and the first switch 71. The first light emitting device 41 is electrically connected to the secondary battery 64, the diode 63 and the second switch 72 at a first node. One end of the second light emitting device 51 is electrically connected to the secondary battery 64, the diode 63 and the first switch 71 at a second node. The other end of the second light emitting device 51 is electrically connected to the rectification unit 2. The control unit 7 is electrically connected to the rectification unit 2 and, respectively, to the first switch 71 and the second switch 72, for detecting the direct current voltage output by the rectification unit 2 and controlling the first switch 71 and the second switch 72 corresponding to the direct current voltage.

The alternate current voltage is provided as a sine wave. When the alternate current voltage is provided to the rectification unit 2, the control unit 7 detects the voltage V generated by the rectification unit 2. When the voltage V is lower than a predetermined voltage value Vs (V<Vs), the control unit 7 generates a signal to switch off the first switch 71 and the second switch 72 to create conductance, thus the current flows to the secondary battery 64 for electric power storage. When the voltage V is higher than the predetermined voltage value Vs (V>Vs), the control unit 7 generates a signal to switch on the first switch 71 and the second switch 72 to create an open circuit, thus the current flows to the first light emitting device 41 and the second light emitting device 51. In this case, the secondary battery 64 with electric power stored therein generates a reverse voltage to reduce the total voltage difference of the load, and increase the LED efficiency and the power factor.

The preferred embodiments of the present invention have been disclosed in the examples. However, the examples should not be construed as a limitation on the actual applicable scope of the invention, and as such, all modifications and alterations without departing from the spirits of the invention and appended claims shall remain within the protected scope and claims of the invention.

What is claimed is:

1. A light emitting device driving circuit, comprising:
a rectification unit configured to rectify an outside alternate current voltage to output a direct current voltage;
a current limiting unit electrically connected to the rectification unit, and generating a direct current corresponding to the direct current voltage;
a load connected between the current limiting unit and the rectification unit, the load comprising a first light emitting device, a reverse voltage providing unit and a second light emitting device connected in serial sequentially, the first light emitting device and the reverse voltage providing unit connected with a first node, and the reverse voltage providing unit and the second light emitting device connected with a second node;
a first switch connected between the current limiting unit and the second node;
a second switch connected between the rectification unit and the first node; and
a control unit connected between the rectification unit and the second light emitting device for detecting the direct current voltage and switching on and off the first switch and the second switch corresponding to the direct current voltage;
wherein, when the direct current passes through the first light emitting device or the second light emitting device, a voltage drop is generated between the two ends of the first light emitting device or the second light emitting device, and the reverse voltage providing unit provides a reverse voltage, the reverse voltage provided with an opposite polarity corresponding to the voltage drop.

2. The light emitting device driving circuit according to claim 1, wherein the rectification unit is a bridge rectifier.

3. The light emitting device driving circuit according to claim 1, wherein the first light emitting device or the second light emitting device are organic light emitting diodes (OLEDs), light emitting diodes (LEDs) or electroluminescent light emitting devices.

4. The light emitting device driving circuit according to claim 1, wherein the first switch and the second switch are metal-oxide-semiconductor field-effect transistors (MOSFETs), relays or bipolar junction transistors (BJTs).

5. The light emitting device driving circuit according to claim 1, wherein the reverse voltage providing unit is a secondary battery or a capacitor.

6. The light emitting device driving circuit according to claim 1, further comprising a diode connected between the first node and the second node.

* * * * *